US011673681B2

(12) United States Patent
Porte et al.

(10) Patent No.: US 11,673,681 B2
(45) Date of Patent: Jun. 13, 2023

(54) ANTERIOR PART OF A NACELLE OF AN AIRCRAFT PROPULSION ASSEMBLY HAVING A THERMAL TRANSITION REGION

(71) Applicant: Airbus Operations SAS, Toulouse (FR)

(72) Inventors: Alain Porte, Toulouse (FR); Frédéric Vinches, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 245 days.

(21) Appl. No.: 16/990,298

(22) Filed: Aug. 11, 2020

(65) Prior Publication Data

US 2021/0107670 A1 Apr. 15, 2021

(30) Foreign Application Priority Data

Aug. 13, 2019 (FR) ...................................... 1909181

(51) Int. Cl.
*F02C 7/047* (2006.01)
*B64D 33/02* (2006.01)

(52) U.S. Cl.
CPC .............. *B64D 33/02* (2013.01); *F02C 7/047* (2013.01)

(58) Field of Classification Search
CPC ....................................................... F02C 7/047
See application file for complete search history.

(56) References Cited

U.S. PATENT DOCUMENTS 6,443,395 B1 * 9/2002 Porte ...................... B64D 15/04 60/39.093
2011/0168852 A1 * 7/2011 Porte ...................... B64C 21/10 427/299
2012/0048389 A1 3/2012 Chelin et al.
2012/0090694 A1 * 4/2012 Porte ...................... B64D 33/02 137/15.1
2012/0118400 A1 * 5/2012 Bouillon ................ B64D 33/02 137/15.1
2017/0096238 A1 4/2017 Porte et al.
(Continued)

FOREIGN PATENT DOCUMENTS

EP 3501991 A1 6/2019

OTHER PUBLICATIONS

French Search Report; priority document.

*Primary Examiner* — Lorne E Meade
(74) *Attorney, Agent, or Firm* — Greer, Burns & Crain, Ltd.

(57) ABSTRACT

An anterior part of a nacelle of a propulsion assembly of an aircraft, having an air intake lip and a front frame disposed at the rear of the air intake lip that connects an outer part to an inner part of the air intake lip. A de-icing duct is formed in front of the front frame. The front frame is shaped so that the de-icing duct has a main cavity and a thermal transition region formed behind the main cavity between an internal face of the outer part of the air intake lip and the front frame. The thermal transition region extends over a longitudinal dimension greater than its average radial dimension, the front frame forming, with respect to the internal face of the outer part of the air intake lip, an angle, measured longitudinally, of between −20° and +10° over the majority of the thermal transition region.

7 Claims, 5 Drawing Sheets

D2 72 4 D1 12 7 21 5 10 13 2 1 71 11 3

(56) References Cited

U.S. PATENT DOCUMENTS

| | | | | |
|---|---|---|---|---|
| 2018/0170568 | A1* | 6/2018 | Porte | B64F 5/40 |
| 2019/0193833 | A1* | 6/2019 | Vinches | B64D 33/02 |
| 2020/0164961 | A1* | 5/2020 | Bensmann | B64D 33/02 |
| 2021/0107669 | A1* | 4/2021 | Porte | B64D 29/00 |

* cited by examiner

ANTERIOR PART OF A NACELLE OF AN AIRCRAFT PROPULSION ASSEMBLY HAVING A THERMAL TRANSITION REGION

CROSS-REFERENCES TO RELATED APPLICATIONS

This application claims the benefit of the French patent application No. 1909181 filed on Aug. 13, 2019, the entire disclosures of which are incorporated herein by way of reference.

FIELD OF THE INVENTION

The present invention relates to aircraft propulsion assemblies and more particularly to nacelles of aircraft propulsion assemblies.

BACKGROUND OF THE INVENTION

A propulsion assembly is a device for generating thrust, which constitutes the motive force of the aircraft equipped with the propulsion assembly. An aircraft propulsion assembly is shown by way of example in FIG. 1.

An example of a conventional installation of a nacelle N of a propulsion assembly on an aircraft A is shown in FIG. 2.

The nacelle conventionally has an anterior part P1 forming an air intake. The anterior part P1 has the role of collecting air so as to ensure a regular flow towards the fan. The nacelle also has a main part P2 constituting the rest of the nacelle.

The propulsion assembly generally extends about an axis referred to below as the longitudinal axis L. As a result of the substantially cylindrical shape that the nacelle has about the longitudinal axis L, any straight line that intersects the axis L in a manner perpendicular thereto is referred to as radial.

A conventional structure of an anterior part P1 of a nacelle of an aircraft propulsion assembly, as is known from the prior art, is described with reference to FIG. 3.

The anterior part P1 of the nacelle comprises an air intake lip 1, which may be annular or substantially annular and is disposed at its front end.

Throughout the present document, the concepts of "front" and "rear", of "anterior" and "posterior", and of "upstream" and "downstream" are to be understood with reference to the direction of the stream of air in the propulsion assembly. Thus, the air enters through the front of the propulsion assembly, i.e., through the anterior part P1 of the nacelle, and leaves (after some of the air has been used as oxidant) through the rear of the propulsion assembly, i.e., through the rear end of the main part P2.

Furthermore, throughout the present document, an "outer" element denotes an element that is radially remote from the longitudinal axis L, typically forming the boundary of the overall volume of the nacelle, while an "inner" element denotes an element that is close to the longitudinal axis L. For example, the primary and secondary streams of an aircraft propulsion assembly flow in the inner duct formed by the nacelle of the propulsion assembly.

The concept of internal (as opposed to the concept of external) to the nacelle denotes the region situated in the thickness of the aerodynamic profile forming the nacelle.

According to the conventional structure of an anterior part P1 of the propulsion assembly, a front frame 2 is disposed at the rear of the air intake lip 1. The assembly formed by the air intake lip 1 and the front frame 2 is referred to as a "D-duct" assembly, owing to the D-shaped section of the duct thus formed. The D-duct generally performs a de-icing function by means of hot air brought into this assembly from the engine by a supply tube. Thus, the space formed in the D-duct assembly is referred to as a de-icing duct 7. The front frame 2 may take, in a known manner, various shapes. It may have a curved section, as shown in FIG. 3, or have a section that is straight, radial or inclined so as to have an inner edge that is further forwards than its outer edge.

An inner structure 3 extends an inner part 11 of the air intake lip 1 towards the rear. The inner structure 3 may correspond to a soundproofing panel or any other form of wall defining a duct channeling the air in the direction of the motor situated in the main part of the nacelle.

An outer panel 4 extends an outer part 12 of the air intake lip 1 towards the rear.

The boundary between the inner part 11 and the outer part 12 is formed by the leading edge 10 of the air intake lip 1. Leading edge is understood to mean the edge of the air intake lip that is furthest forwards when the nacelle is assembled, and that separates the suction side from the pressure side of the aerodynamic profile of the nacelle. The leading edge 10 generally constitutes the line at the front of the nacelle where the radius of curvature of the surface of the nacelle is smallest. In the examples illustrated, the outer and inner parts are substantially symmetrical relative to the leading edge 10. Of course, in another example, the outer part may have a section larger than that of the inner part, or vice versa.

A stiffening frame 5, also referred to as the rear frame, defines the boundary between the anterior part P1 and the main part P2 of the nacelle.

The front frame 2 comprises a first peripheral edge 21 and a second peripheral edge 22. The first peripheral edge 21 is generally fastened at the interface between the air intake lip 1 and the outer panel 4. This connection is realized on peripheral fastening lines or peripheral lines of assembly means 6, that may be termed "orbital seams", by riveting the front frame 2 through the thickness of the external wall. In practice, the air intake lip 1 or the outer panel 4 are riveted to the first peripheral edge 21 of the front frame 2. Optionally, the rivets 6 may form a common rigid connection between the air intake lip 1, the outer panel 4 and the front frame 2.

The air enters the D-duct at very high temperature, typically of the order of 350° C. or even 400° C., and circulates therein in order to prevent the formation of ice on the air intake lip.

Now, the outer panel 4 of the nacelle may be made from a composite or hybrid composite/metallic material. The use of a composite material makes it possible to significantly reduce the weight of the nacelle while guaranteeing enhanced mechanical properties (stiffness, strength). The envisaged composite materials in particular include composite materials with an organic matrix that are reinforced with carbon and/or aramid fibers, or with another suitable fiber. Such composite materials deteriorate, however, at a temperature substantially lower than the temperature of the air circulating in the de-icing D-duct. In particular, at a temperature higher than 150° C. to 180° C., depending on the composite materials, the latter are liable to deteriorate prematurely.

In order to prevent deterioration of the outer panel of the nacelle in the vicinity, the present invention aims to propose a configuration making it possible to prevent the outer panel being exposed to too high a temperature, in particular at the interface with the air intake lip.

SUMMARY OF THE INVENTION

Thus, the invention relates to an anterior part of a nacelle of a propulsion assembly of an aircraft, the anterior part having a front end allowing air to enter and a rear end intended to be connected to the rest of the nacelle, the anterior part comprising an air intake lip disposed at the front end and comprising a leading edge and an outer part and an inner part that are delimited by the leading edge, an outer panel extending an outer part of the air intake lip, an inner structure extending the inner part of the air intake lip, a front frame disposed at the rear of the air intake lip, the front frame comprising a first peripheral edge connected to the outer part of the air intake lip and/or to the outer panel, and a second peripheral edge connected to the inner structure and/or to the inner part of the air intake lip, such that a de-icing duct is formed in front of the front frame, in the air intake lip. The front frame is shaped such that the de-icing duct has a main cavity, situated directly behind the leading edge, and a thermal transition region, the thermal transition region being formed behind the main cavity between an internal face of the outer part of the air intake lip and the front frame, the thermal transition region extending over a longitudinal dimension greater than its average radial dimension.

The front frame forms, with respect to the internal face of the outer part of the air intake lip, an angle, measured longitudinally, of between −20° and +10° over the majority of the thermal transition region, an angle of 0° corresponding to a direction of extension parallel to the internal face, a positive angle corresponding to the front frame moving away from the internal face, from the front towards the rear, a negative angle corresponding to the front frame moving closer to the internal face, from the front towards the rear.

The anterior part thus constituted makes it possible to introduce hot air, typically at 350° C. or more, into the de-icing duct, while making it possible to protect the outer panel from overheating that is liable to deteriorate it in the vicinity of its connection with the air intake lip.

The front frame may extend longitudinally at a distance from the internal face of the outer part of the air intake lip over a majority of the longitudinal dimension of the thermal transition region and moves closer so as to come into contact with the internal face of the outer part of the air intake lip at the rear of the thermal transition region.

The longitudinal dimension of the thermal transition region is, for example, at least two times greater than its average radial dimension.

The front frame may extend substantially parallel to the internal face of the outer part of the air intake lip over the majority of the longitudinal dimension of the thermal transition region.

The front frame may extend from the inner structure as far as the vicinity of the internal face of the outer part of the air intake lip, without, however, coming into contact therewith, and, along the thermal transition region, may move away from the internal face before once again moving closer thereto so as to come into contact therewith at the rear of the thermal transition region.

The air intake lip and the front frame may be metallic, and the outer panel may be made from a composite material or a hybrid composite/metallic material.

The front frame may be connected to the outer part of the air intake lip at a connection interface between the outer part of the air intake lip and the outer panel.

The air intake lip, the front frame and the outer panel may be connected to one another without an attached rigid through-element.

The invention also relates to a nacelle of an aircraft propulsion unit having an anterior part as described above, and also having means for collecting hot air at an engine fitted in the nacelle, and for introducing the hot air into the de-icing duct.

BRIEF DESCRIPTION OF THE DRAWINGS

Other particular features and advantages of the invention will become more apparent in the description below, with reference to the appended drawings, which are given by way of non-limiting examples.

DETAILED DESCRIPTION OF THE PREFERRED EMBODIMENTS

Figure 1:
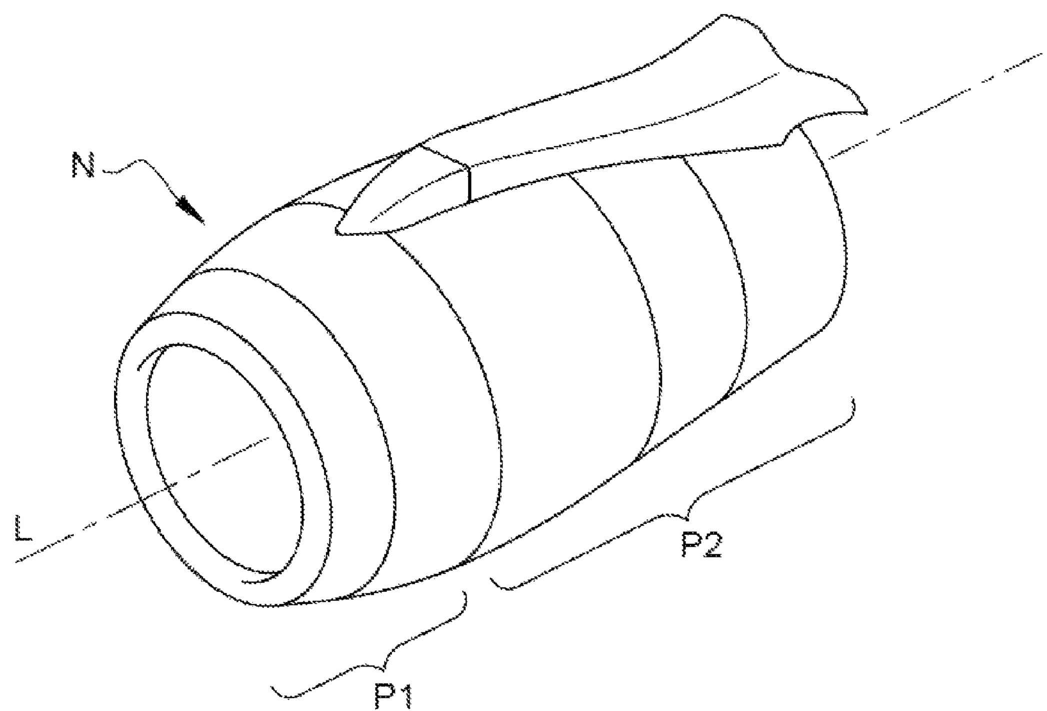
FIG. 1 shows, in a schematic three-dimensional view, an aircraft propulsion assembly.
Figure 2:
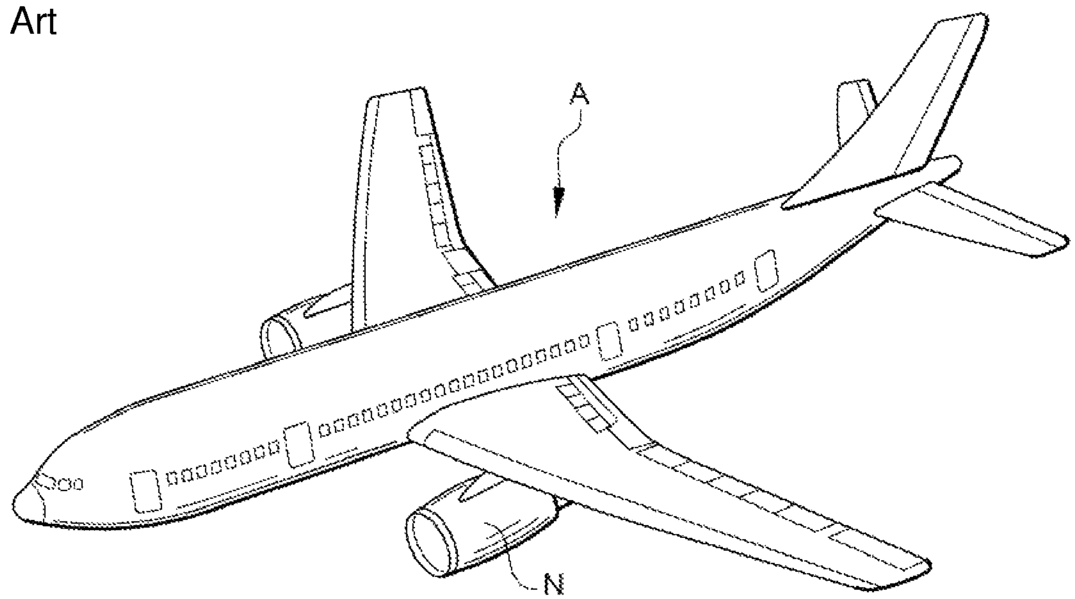
FIG. 2 shows an aircraft in a schematic three-dimensional view.
Figure 3:
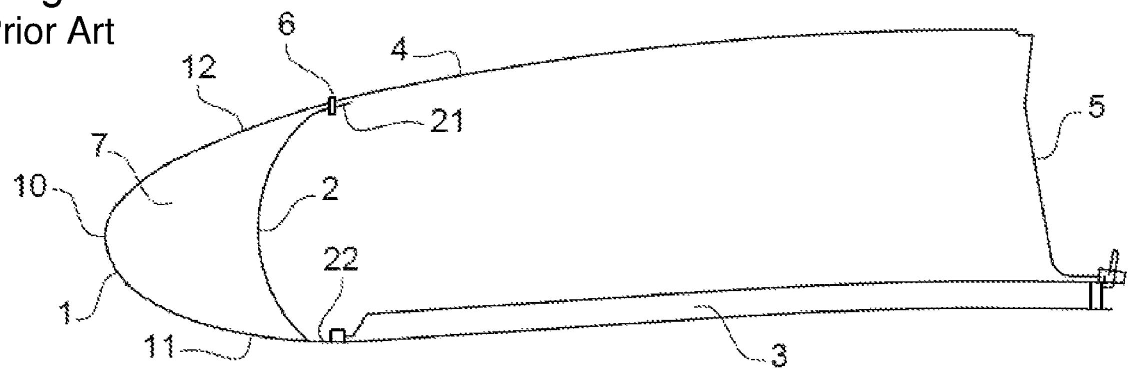
FIG. 3 shows, in a partial concept view in cross section, an anterior part of a nacelle of an aircraft propulsion assembly in accordance with the prior art.

FIGS. 1 to 3, which present general features of aircraft propulsion assemblies and a configuration of an anterior part of a nacelle in accordance with the prior art, were described above in the preamble of the present document. The same references as those used in the description of FIGS. 1 to 3 are used to denote the same elements in the remainder of the present description.

Figure 4:
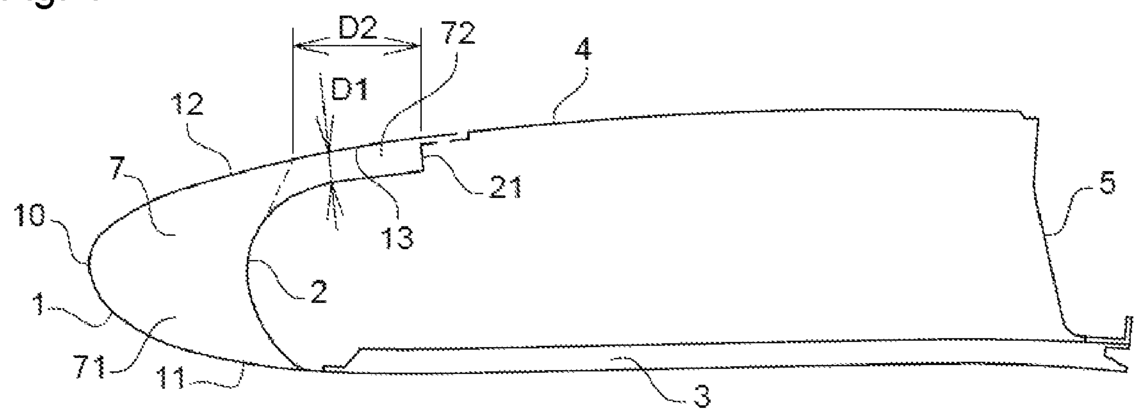
FIG. 4 shows, in a view analogous to the one in FIG. 3, an anterior part of a nacelle illustrating the principle developed in the invention according to a first variant.

FIG. 4 shows an anterior part of a nacelle of an aircraft propulsion unit that illustrates the principle developed in the invention. In a manner analogous to the prior art described with reference to FIG. 3, the anterior part of a nacelle has an air intake lip 1 extended in its inner part by an inner structure 3 such as a soundproofing panel, and an outer part extended by an outer panel 4.

The outer panel 4 is advantageously made from a composite or hybrid composite/metallic material.

Just as in the prior art, a de-icing duct 7 is formed between the air intake lip 1 and the front frame 2.

In the invention, the de-icing duct 7 has two regions, namely a main cavity 71 and a thermal transition region 72.

The main cavity 71 is situated directly behind the leading edge 10 of the air intake lip. The main cavity 71 corresponds to the most effective de-icing region of the de-icing duct 7, in which the air circulates at a high temperature so as to have a relatively uniform temperature therein. The main cavity may have substantially the same section as a conventional de-icing duct, such as that in FIG. 3, as is shown by the virtual boundary, indicated in dashed line, between the main cavity 71 and the thermal transition region 72.

The thermal transition region 72 is for its part formed behind the main cavity 71, along the outer part 12 of the air intake lip 1. More particularly, the thermal transition region 72 is created between the front frame 2, in the vicinity of its first peripheral edge 21, and an internal face 13 of the outer part 12 of the air intake lip 1.

The thermal transition region comprises a part of the de-icing duct 7 that has a small thickness or radial dimension D1, in particular compared to its length or more generally its longitudinal dimension D2.

Beyond the inverse curvature allowing the frame to meet the internal face 13, the front frame 2 does not substantially move away from the internal face 13 of the outer part 12 of the lip over a majority of the length D2, namely more than 50% of the length D2: this means that, over a majority of the length D2, the frame 2 moves closer to the internal face 13 and/or remains substantially parallel to the internal face 13.

The front frame extends parallel to the internal face 13 of the outer part 12 over at least 20% of the length D2.

As a result of its configuration and position, the thermal transition region is relatively unfavorable to the circulation of air, such that a temperature gradient is created between the main cavity 71 and the first peripheral edge 21 of the frame 2 that is situated behind the thermal transition region.

In order to obtain the desired thermal gradient, the longitudinal dimension D2 of the thermal transition region 72 is at least two times greater than its average radial dimension D1. The average radial dimension D1 is mentioned since the radial dimension D1 may be variable along (i.e., in the longitudinal direction of) the thermal transition region 72, as will be described below by way of example with reference to FIG. 7. Preferentially, the longitudinal dimension D2 of the thermal transition region 72 is at least two times greater than its radial dimension D1 at any point in the thermal transition region 72.

The thermal transition region thus makes it possible to maintain an acceptable temperature, typically lower than 180° C. or 150° C. at the front edge of the outer panel 4, i.e., at the connection between the air intake lip 1, the outer panel 4 and the front frame 2, when air at 350° C. to 400° C. is introduced into the de-icing duct 7.

According to the variant of the invention that is shown in FIG. 4, the front frame 2 is connected to the outer part 12 of the air intake lip, in front of the join between the air intake lip and the outer panel 4.

Figure 5:
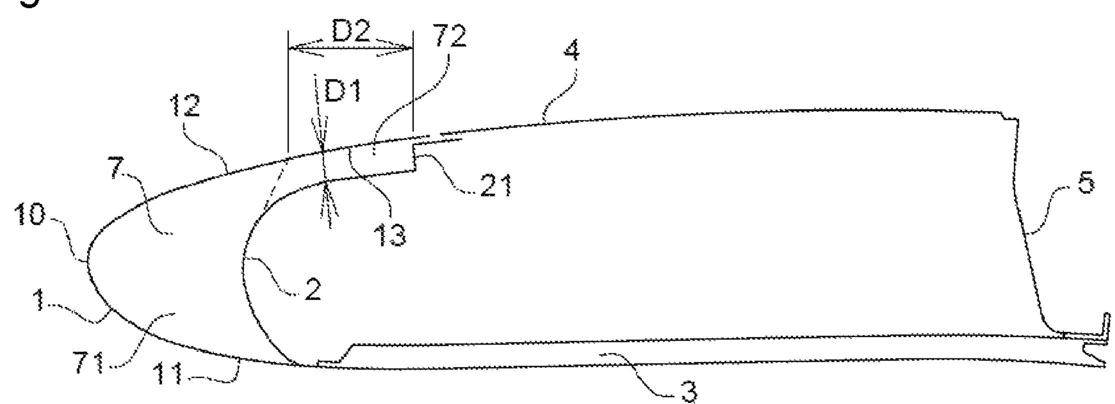
FIG. 5 shows, in a view analogous to the one in FIG. 3 and FIG. 4, an anterior part of a nacelle illustrating the principle developed in the invention according to a second variant.

The variant of the invention that is shown in FIG. 5 is identical to that of FIG. 4, except for the join of the peripheral edge of the front frame 2. In the example in FIG. 5, the front frame 2 is connected to the outer part 12 of the air intake lip 1, extends behind the air intake lip 1, and is also connected to the outer panel 4 at its extension behind the air intake lip 1.

FIG. 4 and FIG. 5 present schematic embodiments of the invention, in which a thermal transition region 72 is formed that has a constant radial dimension as far as its rear end where the frame 2 is connected to the outer part of the air intake lip at its connection interface with the outer panel 4.

In practice, the connection between the front frame and the air intake lip/outer panel 4 assembly may be optimized, and likewise the front frame 2 may be shaped even more advantageously. This is illustrated with reference to FIGS. 6 to 9.

Figure 6:
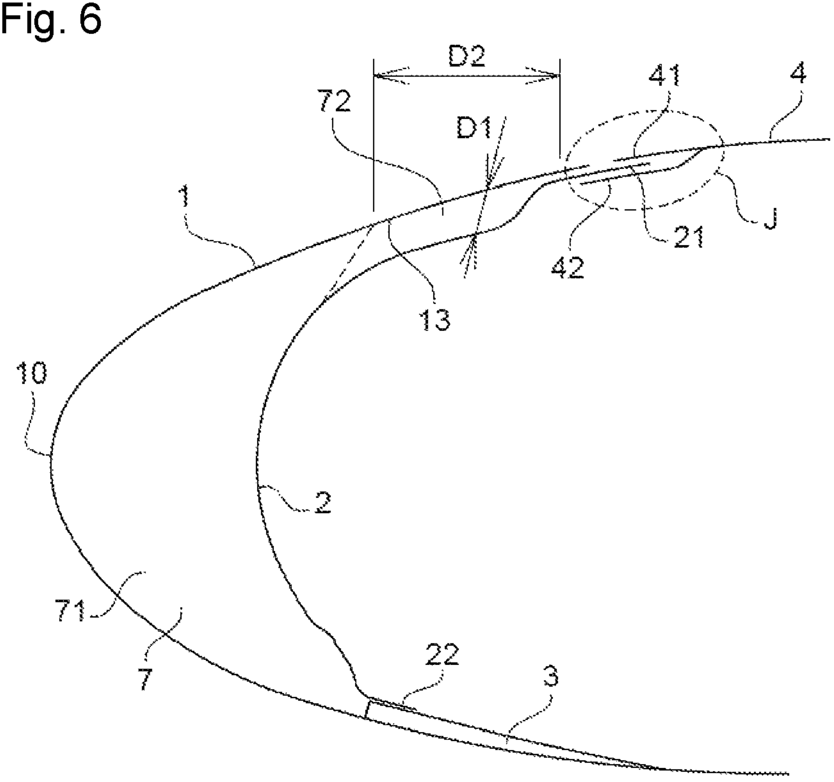
FIG. 6 shows, in a partial concept view in cross section, an anterior part of a nacelle in accordance with a first embodiment of the invention.

FIG. 6 presents the front of an anterior part of a nacelle of an aircraft propulsion unit, in a configuration close to that shown in FIG. 4, corresponding to a first embodiment of the invention. In the example shown in FIG. 6, the outer panel 4 is made from a composite material. The connection between the front frame 2, the air intake lip 1 and the outer panel 4 is realized in a joining region J. In particular, in the joining region J there is realized stacking that makes it possible to connect the front frame 2 and the air intake lip 1 (in particular its outer part 12), as well as nesting of the first peripheral edge 21 of the front frame 2 and the outer panel 4, allowing them to be connected to one another. In order to do this, the outer panel has at its front end at least two plies 41, 42 between which the front frame 2 is sandwiched, which front frame 2 is thus nested between the plies 41, 42. The front frame may optionally be adhesively bonded between the two plies 41, 42.

In order to realize such a join, the first peripheral edge 21 of the front frame 2 has to extend parallel to and in contact with the rear edge of the air intake lip 1 and the front edge of the outer panel 4. Thus, the thermal transition region 72 has, viewed in section, a radial dimension D1 that is substantially constant over a majority of its longitudinal dimension D2, and narrows towards the rear as a result of a double curvature of the front frame 2 that allows the front frame 2 to move closer to the internal face 13 of the outer part 12 of the air intake lip 1, to form a tangent thereto, and to run along same, in contact therewith, in the joining region J.

Likewise, the boundary between the main cavity 71 and the thermal transition region 72 may be shaped so as to have a regular and rounded shape. Such a rounded configuration having a connection of the frame that is behind plumb with its main direction of extension makes it possible, in addition to the advantages of the invention in terms of thermally protecting the outer panel 4, to manage the thermal expansion of the outer frame 2.

Specifically, the front frame, which is generally made of metal, for example titanium, experiences significant thermal expansion that may result in significant deformation due to large temperature differences that it undergoes, with respect to the rest of the nacelle. Specifically, the air inside the nacelle flows in the de-icing duct at a temperature close to 400° C., while outside the nacelle the temperature of the air is close to negative values of the order of −50° C. The temperature difference between the inside and the outside of the nacelle causes the differential expansion of the front frame with respect to the outer walls of the nacelle.

The formation of a thermal transition region thus allows, in addition to thermal protection of the outer panel 4, expansion of the front frame 2 without the latter deforming the outer part of the air intake lip, which would result in the aerodynamic profile thereof being altered. The thickness of the front frame may be small in the thermal transition region, for example between 0.5 and 1 mm, preferably of the order of 0.8 mm. Thus, this part of the front frame having a small thickness and, where appropriate, a slight curvature, may act as an expansion damper.

Figure 7:
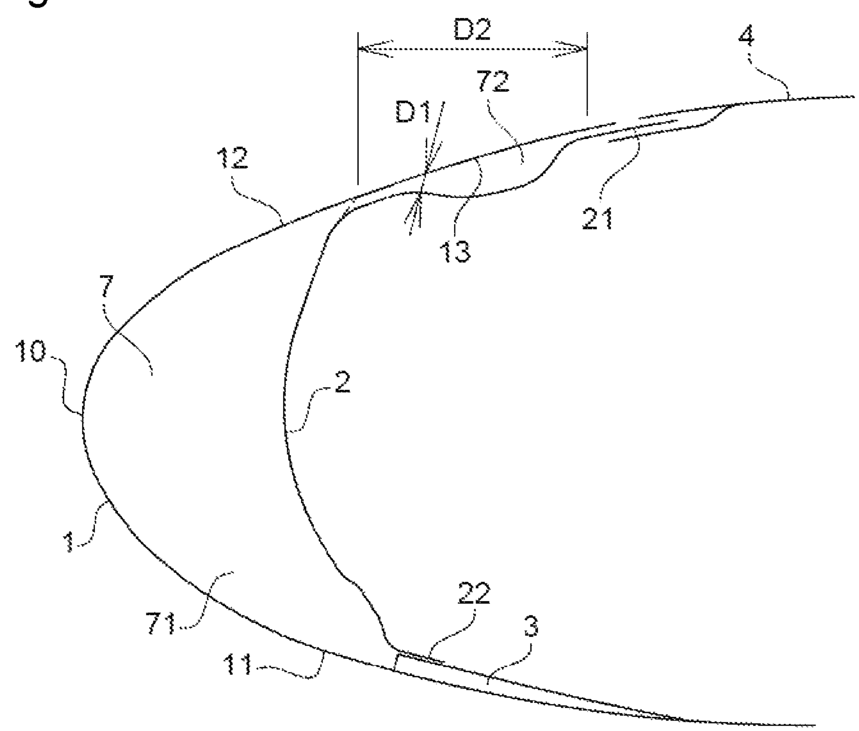
FIG. 7 shows, in a partial view in cross section, an anterior part of a nacelle in accordance with a second embodiment of the invention.

FIG. 7 shows, in a view analogous to the one in FIG. 6, a second embodiment of the invention. In this embodiment, the radial dimension D1 of the thermal transition region 72 is variable along the thermal transition region 72. In particular, the front frame is in the immediate vicinity of the internal face 13 of the outer part 12 of the air intake lip 1 at the front of the thermal transition region 72. Nevertheless, there is no contact here between the front frame 2 and the air intake lip. This allows communication between the main cavity and the thermal transition region, which allows the desired temperature gradient to be created, and also allows the front frame to be deformed without altering the aerodynamic profile. Towards the rear of the thermal transition region, the front frame 2 moves away from the internal face 13 of the outer part 12 of the air intake lip 1. Then, just as in the embodiment in FIG. 4, the front frame once again moves closer to the internal face 13 of the outer part 12 of the air intake lip 1 so that its first peripheral edge comes into contact therewith tangentially, so as to realize a join between the front frame, the air intake lip 1 and the outer panel 4 that is analogous to that described with reference to FIG. 6.

The thermal transition region 72 thus has a narrowing at its inlet, limiting the passage of hot air, while having a volume and thus a thermal inertia that ensure the protection of the outer panel 4.

Numerous other configurations of the front frame may be envisaged. The front frame may, in particular, be described by its longitudinal orientation compared to that of the outer part 12 of the air intake lip 1, i.e., by the angle formed relative to the internal face 13 of the outer part 12. Advantageously, this angle is between −20° and +10° over the entire thermal transition region, except for the double curvature of the front frame 2 that allows it to meet the internal face 13 of the outer part 12 of the air intake lip 1, an angle of 0° corresponding to a direction of extension parallel to the internal face 13 of the outer part 12 of the air intake lip 1, a positive angle corresponding to the front frame moving away from the internal face 13, from the front towards the rear, a negative angle corresponding to the front frame moving closer to the internal face 13, from the front towards the rear. When the angle leaves the range between −20° and +10°, there is a change from the thermal transition region 72 to the main cavity 71.

Figure 8:
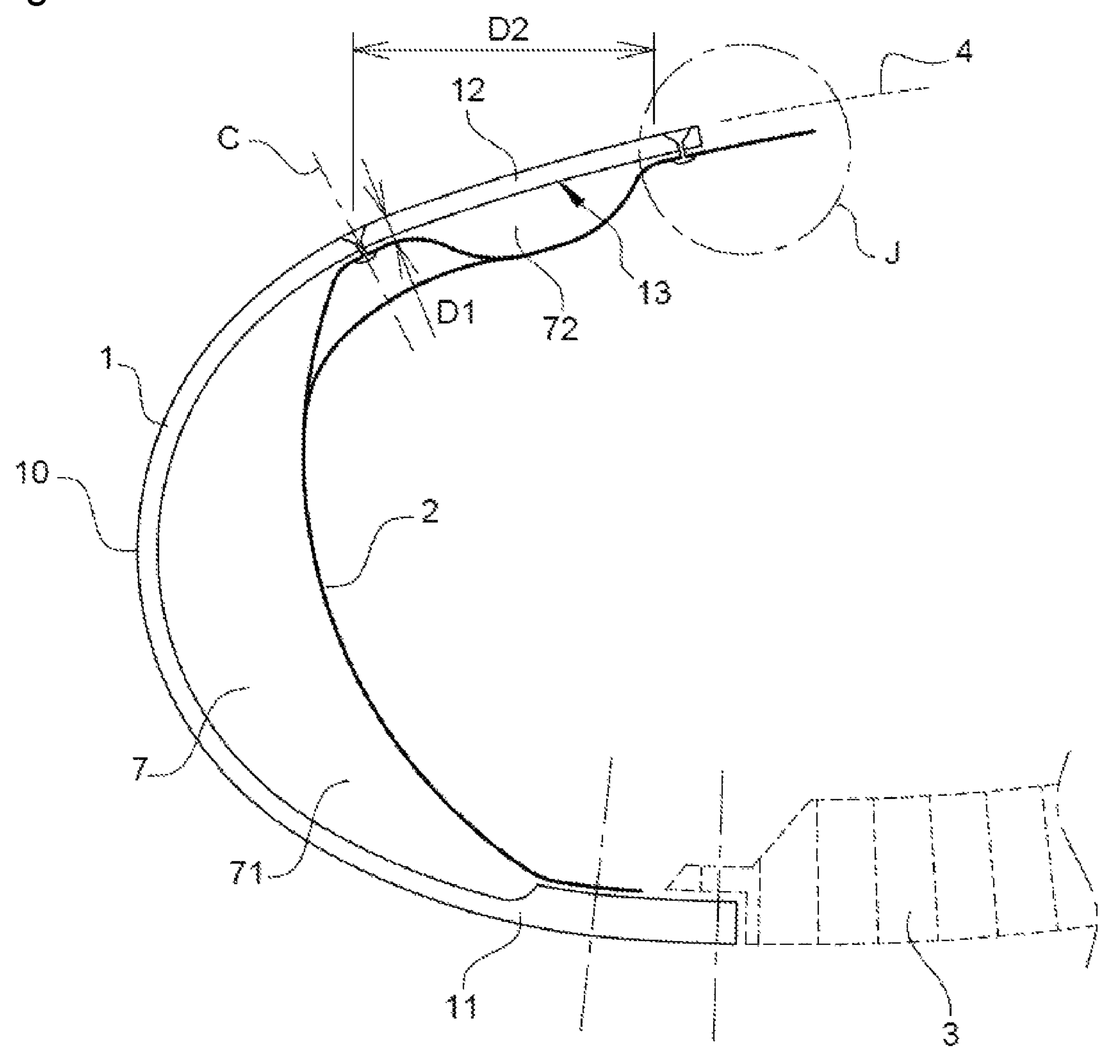
FIG. 8 shows, in a partial view in cross section, an anterior part of a nacelle in accordance with a third embodiment of the invention.
Figure 9:
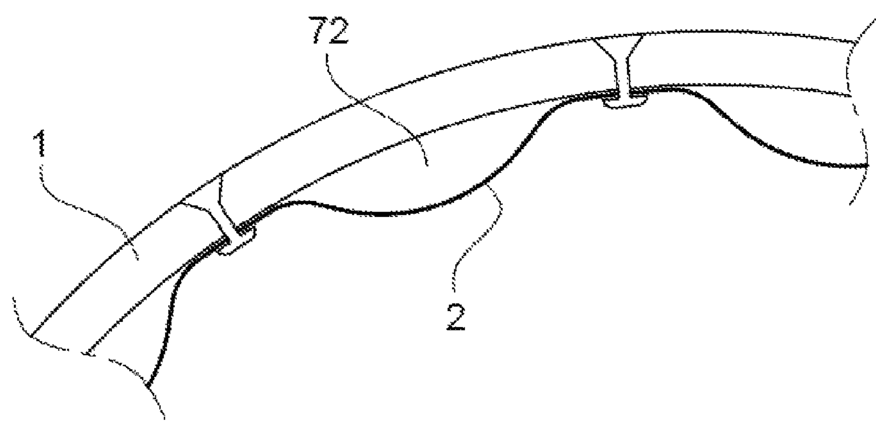
FIG. 9 shows, in a partial view in transverse cross section, one aspect of the third embodiment in FIG. 8.

FIG. 8 shows, in a view analogous to the one in FIG. 6, a third embodiment of the invention. In this embodiment, the radial dimension D1 of the thermal transition region 72 is variable along the periphery of the front frame 2, as shown in FIG. 9, and this also leads to variability of the dimension along the thermal transition region 72. FIG. 9 is a view in transverse cross section on the section plane C shown in FIG. 8, presenting a portion of the periphery of the outer part 12 of the air intake lip 1 and of the periphery of the front frame 2. As shown in FIG. 9, the front frame 2 is connected to the outer part 12 of the air intake lip at a certain number of points that are situated at the inlet of the thermal transition region 72 and distributed regularly on the periphery of the front frame 2. Thus, along the periphery of the outer part 12 of the air intake lip at the inlet of the thermal transition region 72, the front frame 2 describes a substantially sinusoidal curve that successively moves it closer to and away from the outer part 12 of the air intake lip 1. The front frame 2 has progressive and regular curvatures in the thermal transition region 72. Thus, in the longitudinal direction of the thermal transition region, depending on the longitudinal section considered, the thermal transition region has a more or less variable radial dimension. In particular, the radial dimension of the thermal transition region is essentially constant in the longitudinal sections for which the front frame 2 is furthest from the air intake lip at the inlet of the thermal transition region, and the radial dimension of the thermal transition region is highly variable for the sections for which the front frame 2 is in contact with and connected to the air intake lip at the inlet of the thermal transition region.

The configuration presented in FIGS. 8 and 9 makes it possible to attenuate the vibrations in the device and improves the protection, in particular against avian impacts, by providing two levels of fastening between the front frame and the air intake lip, namely a discrete front fastening and a rear fastening that is continuous along the periphery of the front frame 2.

In the embodiment in FIG. 8, the front frame 2 may optionally, and as shown in FIG. 8, extend behind the air intake lip 1. The outer panel 4 may be fastened to this rear extension of the front frame 2, for example by adhesive bonding.

Optionally, in all the embodiments presented above, an air outlet may be provided at the rear of the thermal transition region 72, through the outer part 12 of the air intake lip 1.

Figure 10:
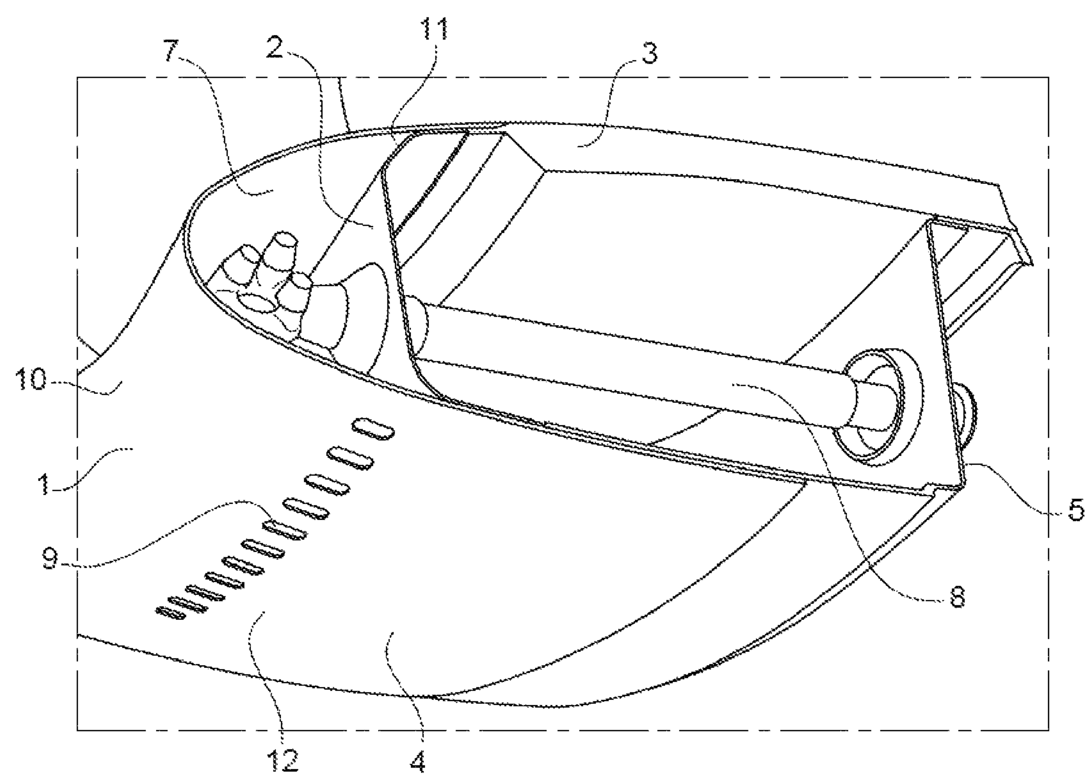
FIG. 10 shows, in a three-dimensional partial view in cross section, an anterior part of a nacelle illustrating another aspect of the invention.

FIG. 10 shows a partial view of an anterior part of a nacelle. It illustrates, in particular, an example of means for introducing hot air into the de-icing duct 7.

The nacelle de-icing systems take hot air from the compression stages of the engine fitted in the nacelle. A set of pipes 8 brings the hot air as far as the de-icing duct 7 in the air intake lip 1. In particular, pipes 8 pass through the rear or stiffening frame 5, substantially longitudinally, then pass through the front frame 2, so as to open into the air intake lip 1.

Valves are installed on these pipes which make it possible to control the system in terms of pressure, flow rate or even temperature. The valves may, in particular, allow or stop the arrival of hot air into the air intake lip, and perform a function of regulating the pressure of the hot air arriving from the engine. Hot air is injected into the de-icing duct 7 through "nozzles" or tubes of the "piccolo" type. This injection circulates the hot air in the de-icing duct, and this allows the leading edge of the nacelle to be de-iced. The air may then be evacuated through openings 9 situated on the outer part 12 of the air intake lip, upstream of the thermal transition region created in the invention.

The present invention thus proposes a structure of an anterior part of a nacelle that makes it possible to thermally protect the outer panel extending the air intake lip, in particular when this panel is made from a composite or hybrid composite/metallic material. Any element other than the outer panel that might be situated in the vicinity of the stiffening frame and that might be liable to thermally deteriorate (for example a glue or an adhesive situated in the joining region) may also be protected as is proposed in the invention, by creation of a thermal transition region at the rear of the de-icing duct, by virtue of suitable shaping of the front frame. Creating a thermal transition region also results in pushing the joining region between the front frame, the air intake lip and the outer panel towards the rear with respect to the front frame. This makes it possible to avoid the effects of the expansion of the front frame on the aerodynamic profile of the nacelle.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An anterior part of a nacelle of a propulsion assembly of an aircraft, said anterior part having a front end allowing air to enter and a rear end configured to be connected to a remainder of the nacelle, said anterior part comprismg:

an air intake lip disposed at said front end and comprising a leading edge and an outer part and an inner part that are delimited by said leading edge, an outer panel extending an outer part of the air intake lip, an inner structure extending the inner part of the air intake lip, a front frame disposed at the rear of the air intake lip, said front frame comprising a first peripheral edge connected to at least one of said outer part of the air intake lip or to the outer panel, and a second peripheral edge connected to at least one of said inner structure or to said inner part of the air intake lip, such that a de-icing duct is formed in front of the front frame, in said air intake lip, wherein the front frame is shaped such that the de-icing duct has a main cavity, situated directly behind the leading edge, and a thermal transition region, said thermal transition region being formed behind the main cavity between an internal face of the outer part of the air intake lip and said front frame, said thermal transition region extending over a longitudinal dimension greater than its average radial dimension, and wherein the front frame forms, with respect to the internal face of the outer part of the air intake lip, an angle, measured longitudinally, of between −20° and +10° over a majority of the thermal transition region, an angle of 0° corresponding to a direction of extension parallel to said internal face, a positive angle corresponding to the front frame moving away from the internal face, from the front towards the rear, a negative angle corresponding to the front frame moving closer to the internal face, from the front towards the rear, wherein the front frame extends substantially parallel to the internal face of the outer part of the air intake lip over the majority of the longitudinal dimension of the thermal transition region.

2. The anterior part of a nacelle according to claim 1, wherein the front frame extends longitudinally at a distance from the internal face of the outer part of the air intake lip over a majority of the longitudinal dimension of the thermal transition region before moving closer so as to come into contact with said internal face of the outer part of the air intake lip at the rear of the thermal transition region.

3. The anterior part of a nacelle according to claim 1, wherein the longitudinal dimension of the thermal transition region is at least two times greater than its average radial dimension.

4. The anterior part of a nacelle according to claim 1, wherein the air intake lip and the front frame are metallic, and the outer panel is made from a material comprising a composite.

5. The anterior part of a nacelle according to claim 1, wherein the front frame is connected to the outer part of the air intake lip at a connection interface between said outer part of the air intake lip and said outer panel.

6. A nacelle of an aircraft propulsion unit having an anterior part in accordance with claim 1, also having a piping with an inlet for receiving hot air from an engine fitted in the nacelle, said piping for transferring hot air towards the de-icing duct, and means for introducing said hot air into the de-icing duct.

7. The anterior part of a nacelle according to claim 1, wherein the material from which the outer panel is made comprises a metallic material.

* * * * *